US011113266B2

United States Patent
Chittimalli et al.

(10) Patent No.: US 11,113,266 B2
(45) Date of Patent: Sep. 7, 2021

(54) DETECTING INCONSISTENCIES IN SEMANTICS OF BUSINESS VOCABULARY AND BUSINESS RULES (SBVR) USING MANY-SORTED LOGIC

(71) Applicant: Tata Consultancy Services Limited, Mumbai (IN)

(72) Inventors: Pavan Kumar Chittimalli, Pune (IN); Ravindra Naik, Pune (IN); Kritika Anand, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 253 days.

(21) Appl. No.: 16/432,631

(22) Filed: Jun. 5, 2019

(65) Prior Publication Data

US 2020/0387497 A1    Dec. 10, 2020

(51) Int. Cl.
*G06F 7/00* (2006.01)
*G06F 17/00* (2019.01)
*G06F 16/23* (2019.01)

(52) U.S. Cl.
CPC ............................... *G06F 16/2365* (2019.01)

(58) Field of Classification Search
None
See application file for complete search history.

(56) References Cited

U.S. PATENT DOCUMENTS

| | | | |
|---|---|---|---|
| 2006/0025987 A1* | 2/2006 | Baisley | G06F 40/211 704/4 |
| 2007/0288412 A1* | 12/2007 | Linehan | G06Q 10/06 706/45 |
| 2011/0251875 A1* | 10/2011 | Cosman | G06Q 30/0264 705/7.31 |

(Continued)

OTHER PUBLICATIONS

Margheri, A. et al. (Jan. 2019) "A Rigorous Framework for Specification, Analysis and Enforcement of Access Control Policies," *IEEE Transactions on Software Engineering*, vol. 45, No. 1; pp. 1-40.

(Continued)

*Primary Examiner* — Tuan A Pham
(74) *Attorney, Agent, or Firm* — Finnegan, Henderson, Farabow, Garrett & Dunner, LLP

(57) ABSTRACT

This disclosure relates generally to detection of inconsistencies in Semantics of Business Vocabulary and Business Rules (SBVR) rules, and, more particularly, to detecting inconsistencies in SBVR using Many-Sorted Logic. Traditional systems and methods implementing graphical and other related techniques are not sufficient to detect anomalies in semantic rules, thereby leading to a different verification approach to detect logical anomalies and errors due to quantification. Embodiment of the present disclosure overcome the limitations faced by the traditional systems and methods by translating a set of SBVR rules into a SBVR eXtensible Markup Language Metadata Interchange (XMI); transforming the SBVR XMI into one or more Satisfiability (Continued)

Modulo Theories Library (SMT-LIB) formulas using at least one logical structure and semantic of Many-Sorted Logic; and detecting, from the one or more SMT-LIB formulas, one or more inconsistencies in semantics of SBVR by using a SMT solver invocation.

8 Claims, 5 Drawing Sheets

(56) References Cited

U.S. PATENT DOCUMENTS

2016/0246992 A1  8/2016  Brutschy et al.

OTHER PUBLICATIONS

Karpovič, J. et al. (Mar. 2010). "Analysis of Possibilities for Representing SBVR Business Vocabularies in Web Ontology Language," *Informacinės Technologijos—Proceedings of Master and PhD students conference on Informatics*, No. 15; pp. 63-67.

\* cited by examiner

DETECTING INCONSISTENCIES IN SEMANTICS OF BUSINESS VOCABULARY AND BUSINESS RULES (SBVR) USING MANY-SORTED LOGIC

TECHNICAL FIELD

The disclosure herein generally relates to detection of inconsistencies in Semantics of Business Vocabulary and Business Rules (SBVR) rules, and, more particularly, to detecting inconsistencies in SBVR using Many-Sorted Logic.

BACKGROUND

Semantic business rules control and constrain the behavior and structure of the business system in terms of its policies and principles. Rules are restructured frequently as per the internal or external circumstances based on market opportunities, statutory regulations, and business focus. Rules conflict with others, when same premise leads to mutually exclusive conclusions. A simple example of conflicting rules occur when the conditions in antecedents are the same, but the consequents are contradictions of each other. Both legislation amendments and business transformation force the enterprises to revisit their business rules, highlighting the need for automatic testing of rules. Consistency checking also aids in the study of effect of addition of a new rule or policy on the already existing set of rules. Also, the compliance checking within the rules is a prerequisite for verifying the business process models against the regulations. Thus, checking for ambiguities within individual rules, and between different rules, both syntactically and semantically is of paramount importance. Traditional systems and methods of detecting inconsistencies manually, is error prone, due to the size, complexity and ambiguity in representation using natural language.

SUMMARY

Embodiments of the present disclosure present technological improvements as solutions to one or more of the above-mentioned technical problems recognized by the inventors in conventional systems. For example, in one embodiment, a method for detecting inconsistencies in Semantics of Business Vocabulary and Business Rules (SBVR) using Many-Sorted Logic, the method comprising: defining, by one or more hardware processors, a set of rules expressed in SBVR, wherein the set of rules comprises syntactic and semantic ambiguities and inconsistencies, and wherein each of the set of rules facilitate one or more actions based upon a specification of one or more conditions; translating, via the one or more hardware processors, the set of SBVR rules into a SBVR eXtensible Markup Language Metadata Interchange (XMI) comprising segregated SBVR vocabulary and rules, wherein the translating is performed by implementing a clustering technique on the set of SBVR rules; transforming the SBVR XMI into one or more Satisfiability Modulo Theories Library (SMT-LIB) formulas using at least one logical structure and semantic of Many-Sorted Logic; detecting, from the one or more SMT-LIB formulas, one or more inconsistencies in semantics of SBVR by using a SMT solver invocation; generating a plurality of graphical clusters for the segregated SBVR vocabulary to schematically represent an inheritance in the segregated SBVR vocabulary; mapping of each of the segregated SBVR rules into a corresponding SMT-LIB representation using one or more axioms, for capturing a set of existing information in each of the segregated SBVR rules; a formulation of the one or more axioms using a Many-Sorted logic for capturing the set of existing information in each of the segregated SBVR rules; and extracting, by implementing a Mapping Regions of Constraint sets (MARCO) technique, all minimally unsatisfiable sub-formulas from the one or more SMT-LIB formulas.

In another aspect, there is provided a system for detecting inconsistencies in Semantics of Business Vocabulary and Business Rules (SBVR) using Many-Sorted Logic, the system comprising a memory storing instructions; one or more communication interfaces; and one or more hardware processors coupled to the memory via the one or more communication interfaces, wherein the one or more hardware processors are configured by the instructions to: define a set of rules expressed in SBVR, wherein the set of rules comprises syntactic and semantic ambiguities and inconsistencies, and wherein each of the set of rules facilitate one or more actions based upon a specification of one or more conditions; translate the set of SBVR rules into a SBVR eXtensible Markup Language Metadata Interchange (XMI) comprising segregated SBVR vocabulary and rules, wherein the translating is performed by implementing a clustering technique on the set of SBVR rules; transform the SBVR XMI into one or more Satisfiability Modulo Theories Library (SMT-LIB) formulas using at least one logical structure and semantic of Many-Sorted Logic; detect, from the one or more SMT-LIB formulas, one or more inconsistencies in semantics of SBVR by using a SMT solver invocation; generating a plurality of graphical clusters for the segregated SBVR vocabulary to schematically represent an inheritance in the segregated SBVR vocabulary; mapping of each of the segregated SBVR rules into a corresponding SMT-LIB representation using one or more axioms, for capturing a set of existing information in each of the segregated SBVR rules; formulating the one or more axioms using a Many-Sorted logic for capturing the set of existing information in each of the segregated SBVR rules; and extracting, via a Mapping Regions of Constraint sets (MARCO) technique, all minimally unsatisfiable sub-formulas from the one or more SMT-LIB formulas.

In yet another aspect, there is provided one or more non-transitory machine readable information storage mediums comprising one or more instructions which when executed by one or more hardware processors causes the one or more hardware processors to perform a method for detecting inconsistencies in Semantics of Business Vocabulary and Business Rules (SBVR) using Many-Sorted Logic, the method comprising: defining a set of rules expressed in SBVR, wherein the set of rules comprises syntactic and semantic ambiguities and inconsistencies, and wherein each of the set of rules facilitate one or more actions based upon a specification of one or more conditions; translating, via the one or more hardware processors, the set of SBVR rules into a SBVR eXtensible Markup Language Metadata Interchange (XMI) comprising segregated SBVR vocabulary and rules, wherein the translating is performed by implementing a clustering technique on the set of SBVR rules; transforming the SBVR XMI into one or more Satisfiability Modulo Theories Library (SMT-LIB) formulas using at least one logical structure and semantic of Many-Sorted Logic; detecting, from the one or more SMT-LIB formulas, one or more inconsistencies in semantics of SBVR by using a SMT solver invocation; generating a plurality of graphical clusters for the segregated SBVR vocabulary to schematically represent an inheritance in the segregated SBVR vocabulary;

mapping of each of the segregated SBVR rules into a corresponding SMT-LIB representation using one or more axioms, for capturing a set of existing information in each of the segregated SBVR rules; a formulation of the one or more axioms using a Many-Sorted logic for capturing the set of existing information in each of the segregated SBVR rules; and extracting, by implementing a Mapping Regions of Constraint sets (MARCO) technique, all minimally unsatisfiable sub-formulas from the one or more SMT-LIB formulas.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
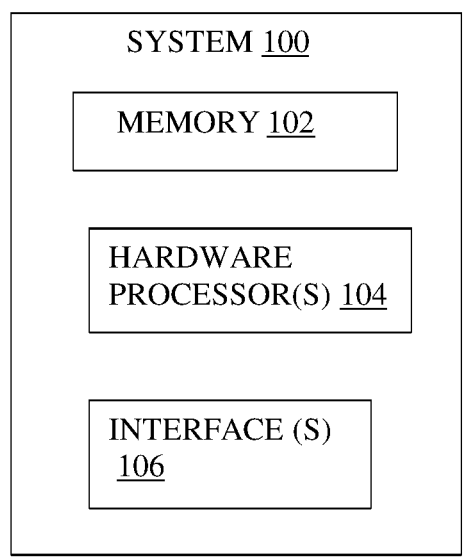
FIG. 1 illustrates an exemplary title system for detecting inconsistencies in Semantics of Business Vocabulary and Business Rules (SBVR) using Many-Sorted Logic, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems and methods for detecting inconsistencies in Semantics of Business Vocabulary and Business Rules (SBVR) using Many-Sorted Logic. Different form of redundancies exist in Semantic rules, namely Non-executable rules, Subsuming rules and Logical Equivalence. Non-executable rules are the group of rules which never execute in a semantic rule set, given any possible conditions. Thus, non-executable rules are those which have conflicting conditions in their antecedents, thus never allowing the consequents to materialize. These conflicting conditions can exist in a single rule or in form of a chain of rules, the latter being much more difficult to detect.

Subsuming rules exist in two different ways, pairwise and in a chain of rules. The former occurs when the antecedents of one rule is a proper subset of another while the consequents are exactly the same and vice versa. The latter occurs due to different inference paths, involving multiple rules, from a given antecedent to a final conclusion. Logical equivalence is present when two rules effectively convey the same logical meaning, that is, they logically imply one another. These type of rules are also called duplicate rules.

Redundancies not only cause the rule set(s) to malfunction, but it decreases the performance significantly. Modern day semantic rules along with structural errors contain logical errors and errors due to quantifications. Traditional systems and methods implementing graphical and other related techniques are not sufficient to detect these form of anomalies, leading to a different verification approach to detect logical anomalies and errors due to quantification.

The method disclosed attempts to overcome the limitations faced by the traditional systems and methods. For example, the method disclosed automated detection of inconsistencies in SBVR-Based Business Rules Using Many-Sorted Logic, wherein all set of inconsistent rules are detected simultaneously.

Referring now to the drawings, and more particularly to FIG. 1 through 5, where similar reference characters denote corresponding features consistently throughout the figures, there are shown preferred embodiments and these embodiments are described in the context of the following exemplary system and/or method.

FIG. 1 illustrates an exemplary block diagram of a system 100 for detecting inconsistencies in Semantics of Business Vocabulary and Business Rules (SBVR) using Many-Sorted Logic, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 can be configured to store any data that is associated with the set of SBVR rules into the SBVR-XMI, transforming the SBVR XMI into one or more Satisfiability Modulo Theories Library (SMT-LIB) formulas, and detecting, from the one or more SMT-LIB formulas, one or more inconsistencies in semantics of SBVR etc. is stored in the memory 102. Further, all information (inputs, outputs and so on) pertaining to detecting of the inconsistencies in SBVR using Many-Sorted Logic may be stored in a database, as history data, for reference purpose.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

Figure 2:
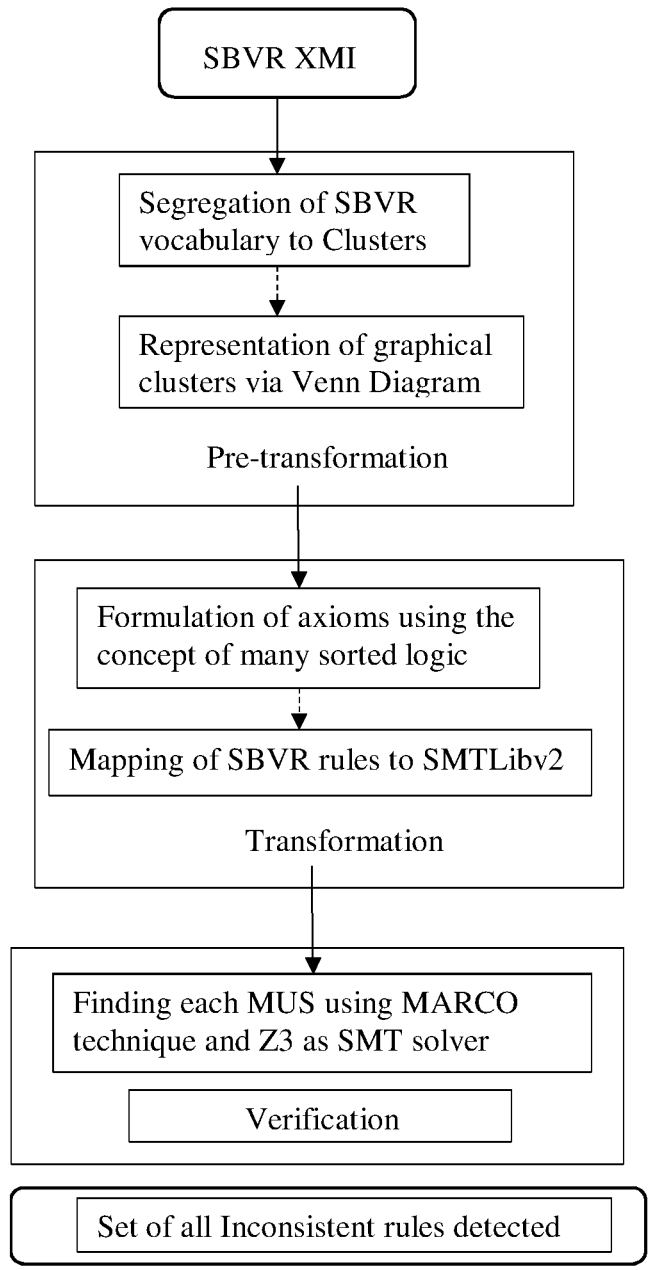
FIG. 2 is an architectural diagram depicting the flow of the system for the detection of inconsistencies in SBVR using Many-Sorted Logic, in accordance with some embodiments of the present disclosure.

According to an embodiment of the present disclosure, by referring to FIG. 2, an architecture of the system 100 for detecting the inconsistencies in SBVR using Many-Sorted Logic may be referred. By referring to FIG. 2, it may be noted that initially, the one or more hardware processors 104 segregate the term, verb, noun, and fact type concepts, which form the core of SBVR vocabulary to graphical clusters, and latter represent the graphical clusters to Venn Diagram. Secondly, the SBVR XMI is translated into the SMT-LIB using Many-sorted Logic, and finally, all the inconsistencies are detected in from the one or more SMT-LIB formulas.

Figure 3:
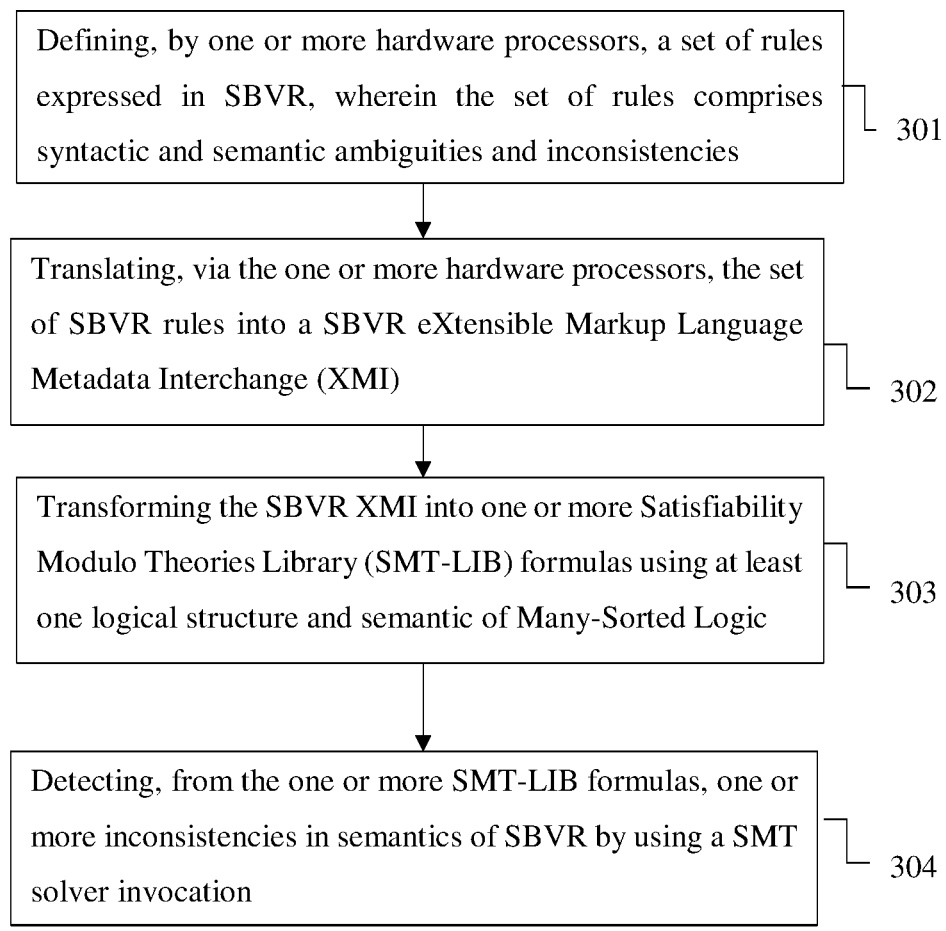
FIG. 3 is a flow diagram illustrating steps involved in the process of detecting inconsistencies in SBVR using Many-Sorted Logic, in accordance with some embodiments of the present disclosure.
Figure 4:
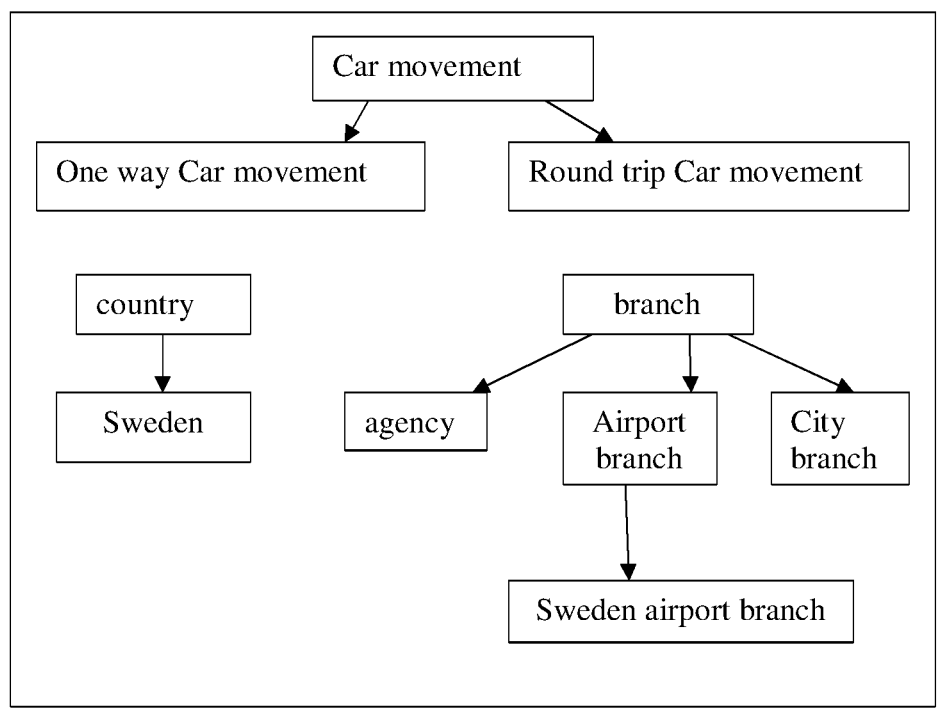
FIG. 4 shows a forest of directed trees constructed from a sample SBVR vocabulary by implementing the method disclosed, in accordance with some embodiments of the present disclosure.

FIG. 3, with reference to FIG. 1 and FIG. 2, illustrates an exemplary flow diagram of a method for detecting the inconsistencies in SBVR using Many-Sorted Logic, in accordance with some embodiments of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

According to an embodiment of the present disclosure, at step 301, the one or more hardware processors 104 are configured to define a set of rules expressed in SBVR, wherein the set of rules comprises syntactic and semantic ambiguities and inconsistencies, and wherein each of the set of rules facilitate one or more actions based upon a specification of one or more conditions. Organizations regulate their business activities by imposing certain logical constraints, often termed as business rules that apply across the process and procedures. Business rules are embedded in the source code of legacy systems, governing policies, work flow descriptions, process flows, decision tables or databases.

Business rules control and constrain the behavior and structure of the business system in terms of its policies and principles. Business rules may be restructured frequently as per the internal or external circumstances based on market opportunities, statutory regulations, and business focus. The real world business rules provides the facility to take one or more actions (consequent) based on the specification of one or more conditions. Multiple conditions can be enumerated using the AND or OR operators, and business rule is processed according to fulfillment of all conditions (AND) or any one of the condition (OR). The major percentage of business rules in real life data is of the below form: if cond1 and cond2 and . . . condm then action1 and action2 and . . . actionm" or if cond1 or cond2 or . . . condm then action1 and action2 and . . . actionm" or The traditional systems and methods may not cite detection of inconsistencies in complex business rules expressed in SBVR. The complex rules are rules wherein the fact types associated with the rule may fall under one of the following categories:
  (i) Rule having the keyword 'that' which is used after a designation for a noun concept and before a designation for a verb concept. Rule r3 is one such instance;
  (ii) Rule involving the keyword 'of' that associates a property with a noun concept like rule r4 below;
  (iii) Rule that is combination of (i) and (ii).

Complex rules may also comprise of logical operators like negation, conjunction, disjunction or implication. For example, rule r5 below is a complex rule of the form "f1 if f2" where f1, f2 are fact types where f2 is of the category (iii). Compliance checking within the rules is a prerequisite for verifying the business process models against the regulations. Thus, checking for ambiguities within individual rules, and between different rules, both syntactically and semantically is of paramount importance.

Further, as is known in the art, SBVR an OMG standard for representing business rules. SBVR is a Controlled Natural Language (CNL) that works as a bridge between business and IT, aiming to provide a way to express business knowledge (requirements, operational procedures etc.) to the IT community. The main reason for choosing SBVR for the rule modelling is due to its declarative nature, natural language representation and support for the first order logic. The SBVR meta-model is used to represent business knowledge as specifying business vocabularies and specifying business rules.

The SBVR business rule is created by combining name, term, and verb with the built-in keywords (quantification, modality or logical operators). In an example implementation, the set of rules may be defined as:
  r1: It is obligatory that each rental has at most 3 additional drivers.
  r2: It is obligatory that each EUrent has at least 4 additional drivers.
  r3: It is obligatory that driver is authorized in country, has driving license that is valid.
  r4: It is obligatory that rented car of the rental is stored at the pick-up branch of the rental.
  r5: It is permitted that a rental is open if an estimated rental charge is provisionally charged to a credit card of renter that is responsible for the rental.
  r6: It is obligatory that the rental duration of each rental is less than 90 rental days.

According to an embodiment of the present disclosure, at step 302, the one or more hardware processors 104 are configured to translate the set of SBVR rules into a SBVR eXtensible Markup Language (XML™) Metadata Interchange (SBVR XMI) by implementing a clustering technique on the set of SBVR rules. As mentioned supra, the process of translating comprises segregating the term, verb, noun, and fact type concepts, which form the core of SBVR vocabulary to graphical clusters and representing the graphical clusters to Venn Diagram(s). The process of translating the set of SBVR rules into the SBVR XMI may now be considered in detail.

In an embodiment of the present disclosure, initially, the one or more hardware processors 104 are configured to construct a forest of directed trees from the SBVR vocabulary. In an example implementation, by referring to FIG. 4, an example of the forest constructed for the SBVR vocabulary mentioned below may be referred. By referring to FIG. 4 again, it may be noted that the individual noun concept 'Sweden_airport_branch' and noun concepts 'airport branch' and 'branch' are related through inheritance. A possible approach may be to use distinct sorts for every SBVR concept.

As is known in the art, Many-sorted logic does not supports the sub-sort relation and an element can only belong to one sort at a time. By referring to FIG. 4 yet again, it may be observed that 'Sweden_airport_branch' is an instance of airport branch and also of 'branch' transitively. To overcome this limitation, the method disclosed provides for a clustering technique, wherein the one or more hardware processors 104 are configured to generate (or form) a graphical cluster for each directed tree of the forest (thereby generating a plurality of graphical clusters).

Further, to schematically represent the logic formula and relations in the graphical cluster, Venn diagram is used. The one or more hardware processors 104 are also configure to create one or more sets (or classes) for every SBVR noun concept and a sub-set relationship between the sets is predicted based upon the parent-child relationship (inheritance) present in the SBVR vocabulary.

SBVR Vocabulary country
car_movement
airport_branch

General Concept: branch agency
General Concept: branch
city_branch
General Concept: branch
Sweden_airport_branch General Concept: airport_branch one_way_car_movement General Concept: car_movement round_trip_car_movement General Concept: car_movement Sweden General Concept: country According to an embodiment of the present disclosure, a graphical cluster may be defined with below properties:

a sub-set relation in Venn diagram associated with graphical cluster is a logical way to represent directed edge in directed tree or inheritance in SBVR vocabulary;

the number of classes in a graphical cluster is equal to the number of general noun concept terms present in the directed tree corresponding to that cluster;

all the nodes of a directed tree of the forest are declared as constants or the members of the corresponding graphical cluster;

each set of Venn diagram associated with graphical cluster is non-empty (every SBVR noun concept is a member of its set);

the parent(B)-child(A) relation is depicted with the notion of proper-subset in Venn diagram (A ⊂ B); and the SBVR noun concepts having the concept type as synonym are represented using the equality of sets.

In an embodiment of the present disclosure, a distinct sort may then be introduced for each graphical cluster. The one or more hardware processors 104 are configured to obtain three graphical clusters, labelled with sorts 'Cluster_Country', 'Cluster_car_movement' and 'Cluster_Branch' for the above SBVR example, whose SMT_LIBv2 translation may be depicted as:

(declare-sort Cluster_Country 0)

(declare-sort Cluster_Branch 0)

(declare-sort Cluster_Car_Movement 0)

Figure 5:
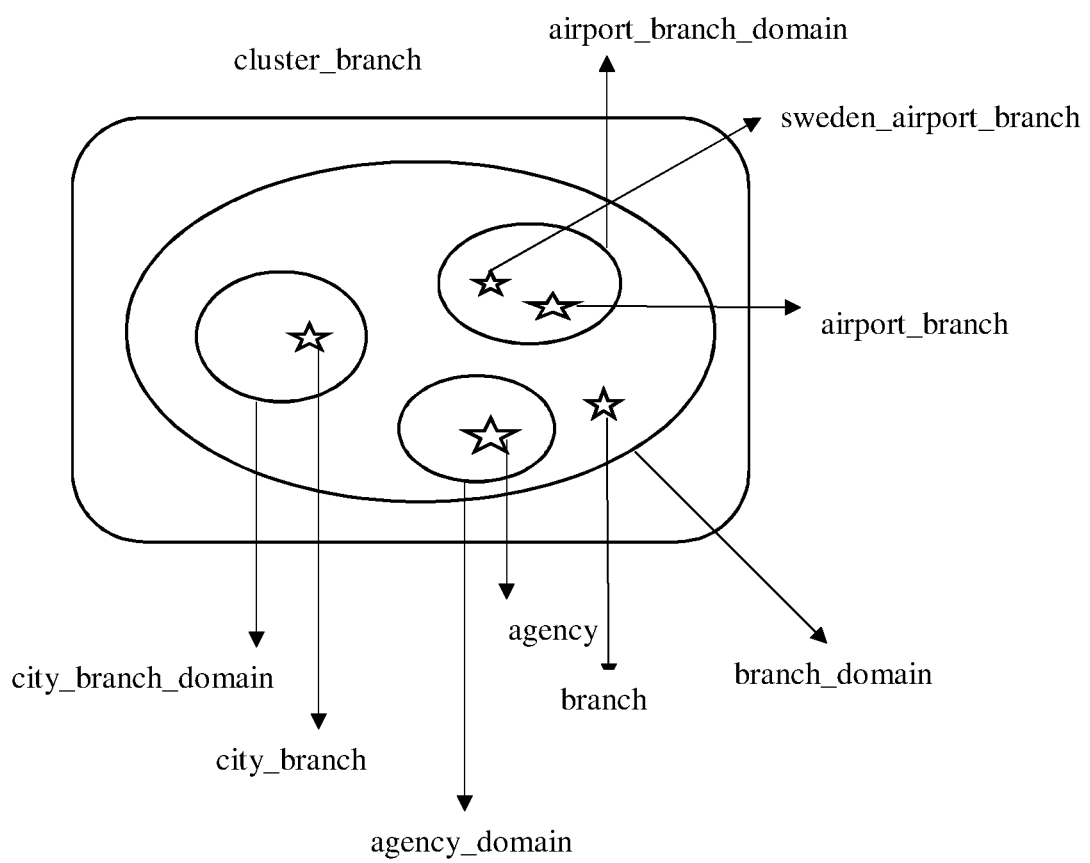
FIG. 5 shows a Venn diagram of a graphical cluster associated with a sort, and representing inheritance in SBVR vocabulary, in accordance with some embodiments of the present disclosure.

By referring to FIG. 5, a Venn diagram of the graphical cluster associated with the sort 'Cluster_Branch' may be referred, wherein the Venn diagram constitutes the 'branch_domain' having sub-sets 'agency_domain', 'city_branch_domain' and 'airport_branch_domain'. It may be noted that a general noun concept that is not hierarchically related to another general noun concept in the SBVR vocabulary comprises only one set in the graphical cluster, but the directed tree corresponding to the cluster may not be a singleton graph (graph consisting of a single isolated node with no edges).

The command declare_const declares a constant of a given type or sort. For example, SMT-LIBv2 formula to assign airportBranch to the sort Cluster_Branch may be represented as:

(declare-sort airportBranch Cluster_Branch)

For representing in SMT-LIBv2 for each set, the one or more hardware processors 104 declare a predicate. The predicate takes as an argument the sort of its graphical cluster and returns a Boolean value. The formula to represent the predicate axiom for the set airport_branch is as below:

(declare-fun airport_branch_domain (Cluster_Branch) Bool)

The one or more hardware processors 104 are configured to formulate one or more axioms using a Many-sorted logic to represent the knowledge in a Venn diagram. Axioms constrain the interpretation of classes, their relationships and contents. The method disclosed provides for defining the following axioms to represent the graphical clusters into FOL:

Inclusion Axiom: Inclusion Axiom allows 'subclass of' relationships to be established between class (set) expressions. C ⊆ D implies that each instance of one C is also an instance of D, thus constructing a hierarchy of classes. Let 'n2' be a noun concept derived from another noun concept 'n1' in SBVR and the sort of the graphical cluster corresponding to 'n1' and 'n2' be Cluster A, then inclusion axiom may be defined as:

$$\forall x \in Cluster\_A, n2\_domain(x) \rightarrow n1\_domain(x)$$

wherein n1 domain and n2 domain are the predicates that corresponds to the sets in Venn diagram for n1 and n1 respectively.

Class Assertion Axiom: Class Assertion Axiom allows to state whether SBVR term is an element of the set, for example, the SMT-LIBv2 formula to assert 'airport_branch' and 'Sweden_airport_branch' to the set 'airport_branch_domain' is:

(assert (airport_branch_domain airport_branch))

(assert (airport_branch_domain Sweden_airport_branch))

Disjoint Class Axiom: According to the Disjoint Class Axiom, the sets in the graphical cluster which are not related through inclusion axiom are disjoint, that is, no SBVR term is an element of two or more sets at a time. Given a graphical cluster of sort Cluster n, the immediate children of noun concept $n_i = \{n_1, n_2, \ldots, n_k\}$. Then, the disjoint class axiom may be defined as:

$\forall x \in Cluster\_n, n_i\_domain(x) \rightarrow \neg(n_1\_domain(x)) \wedge \ldots \neg(n_{i-1}\_domain(x)) \wedge \neg(n_{i+1}\_domain(x))) \wedge \ldots \neg((n_k\_domain(x)) \wedge \neg(n_i = x)$ The method disclosed implements a graph reachability algorithm to identify the sets in the Venn diagram which are to be logically negated. For example, by referring to FIG. 4 yet again, agency and city_branch are not reachable from airport branch while the in FIG. 4 term concepts which are reachable, for example, branch, are added as negation, which conveys the idea that branch does not belong to the set airport_branch_domain. For the cluster 'Cluster_branch', the Disjoint class axiom may be represented as:

$\forall x \in Cluster\_n,$ airport_branch_domain(x) $\rightarrow \neg$ city_branch_domina(x)) $\wedge \neg$(agency_domain(x)) $\wedge \neg$(x+branch);

which by default, hold true. However, if the sets in the graphical structure are overlapping, the Disjoint Class Axiom is not satisfied. This can occur when the definition or rule in SBVR explicitly reveals that an SBVR element is child of two or more concepts.

Equivalent Class Axiom: Considering a noun concept 'n1' as a synonym to noun concept 'n2', the Equivalent Class Axiom allows the two sets of Venn diagram to be equal.

$\forall x \in Cluster\_A, n2\_domain(x) \rightarrow n1\_domain(x)$

Disjoint Union Axiom: As is known in the art, SBVR provides a way to categorize the individuals belonging to certain entity according to a set of different criteria using 'categorization' and 'segmentation' capabilities. Segmentation is the categorization scheme whose contained categories are complete (total) and disjoint with respect to the general concept containing the categorization scheme. Considering the below SBVR vocabulary as an extension of the above vocabulary:

Branches by Type

Definition: Segmentation that is for concept branch and subdivides branch based on branch type
Necessity: Branches by Type includes the categories airport branch and city branch and agency
wherein 'branch type' is the 'categorization' type, on the basis of which the 'branch' is partitioned into mutually exclusive classes. The one or more hardware processors 104 may generate the corresponding FOL for the above example SBVR vocabulary as:

$\forall x \in Cluster\_branch$ branch_domina(x)$\rightarrow$(x=branch)

$\vee$((airport_branch_domain(x))

$\wedge \neg$(agency_domain(x))$\wedge \neg$(city_branch_domain(x)))

((agency_domain(x))

$\wedge \neg$(airport_branch_domina(x))$\wedge \neg$(city_branch_domain(x)))

((agency_domain(x))

$\wedge \neg$(airport_branch_domina(x))$\wedge \neg$(city_branch_domain(x)))

$\vee$((city_branch_domain(x))

$\vee$((city_branch_domain(x))$\wedge$ $\neg$(airport_branch_domina(x))$\wedge \neg$(agency_domain(x)))

According to an embodiment of the present disclosure, at step 303, the one or more hardware processors 104 are configured to transform the SBVR XMI into one or more SMT-LIB formulas using at least one logical structure and semantic of Many-sorted Logic. In general, Many-sorted logic is the generalization of FOL in which the domain of universe is classified into disjunct sorts (or types). The sorts in many-sorted logic are similar to the types in the conventional programming languages. The structure (signature) of many-sorted logic is defined as:

$\sigma = (S, C, F, P)$ wherein

S is the enumerable set of sorts $\{S_1, S_1, \ldots, S_n\}$ and $S_i$ is non-empty, $\Sigma$ is n–sorted.

C is countable set of constant symbols $\{c_1, c_2, \ldots c_k\}$ of sort $S_i$.

F is the countable set of function symbols $\{f_1, f_2, \ldots, f_m\}$ taking sorts as
the arguments.

P is the countable set of predicate symbols $\{p_1, p_2, \ldots, p_j\}$ taking sorts as
the arguments.

Many-sorted logic may be defined by means of the following information.

Many-sorted logic allows the arguments of functions and predicates to have different sorts. Every constant symbol or function return types is associated with a defined sort before its usage;

Many-sorted logic facilitates to perform quantification over a given sorts instead of entire domain of universe;

Sorts in many-sorted logic are mutually exclusive, i.e., a constant in FOL shall always be associated with a single sort and the constants that belong to different sorts can never be equal; and In contrast to the set theory, the sorts in many-sorted logic do not support the subset relation.

Further, Semantic formulations of the SBVR rule comprises modal formulations (necessary, obligatory, impossible, prohibited, and the like); quantifications (universal, existential, at-most-n, at-least-n and exactly-n); and logical operators (logical negation, conjunction, disjunction and implication). Sample SBVR rules may be in the below form:
r1: It is obligatory that each car rental is owned by at least 2 branches.
r2: It is obligatory that driver is authorized in Sweden, has a driving license that is valid To illustrate class of above rules $r_1$ and $r_2$, the method disclosed considers below SBVR vocabulary. Further, to capture the information existing in the SBVR rule, the method disclosed provides for a mapping of each of the segregated SBVR rules into a corresponding SMT-LIBV2 representation using the one or more axioms discussed supra.

SBVR vocabulary:
$n_1$: driver
$n_2$: country
$IN_1$: Sweden
General Concept: Country
$N_2$: Germany
General Concept: Country
$n_3$: branch
$n_4$: car_rental
$n_5$: driving_license
General Concept: license
$n_6$: rental_A
General Concept: car_rental
$n_7$: pick_up_location
$f_1$: driver is authorized in country
$f_2$: driving_license is valid
$f_3$: driver has license
$f_4$: car rental is owned by branch By referring to the above SBVR vocabulary, it may be noted that the rule $r_2$ is based upon facts $f_1$, $f_2$, $f_3$. To further represent facts types in SBVR, the method disclosed provides for creating a new sort BoolVal that may take three values, that is, t (similar to true), f (similar to false) or NA (not assigned). Let bf be the binary fact defined as bf→$n_1 v_1 n_2$, wherein $n_1$ (subject) and $n_2$ (object) are noun concepts related through verb concept $v_1$. The corresponding mapping to SMT-LIBv2 may be specified as:

(declare-const $v_1$ (Array Sort_A Sort_B Bool Val))

wherein Sort_A and Sort_B are the clusters associated with $n_1$ and $n_2$ respectively. The one or more hardware processors 104 assign a default value NA to the predicate for the elements (of sorts) that are not explicitly related in the rules. The SMT-LIBV2 for $f_1$ may be generated as:

(declare-datatype( )((BoolVal NA t f))

(declare-const)

isAuthorizedIn (Array Cluster_Driver Cluster_Country BoolVal))

(assert (=(default is AuthorizedIn)NA))

The rule $r_1$ encompasses the obligation formulation that ranges over an universal quantification. In an embodiment, the universal quantification introduces a variable 'car rental' that scopes over an atleast–n quantification of cardinality 2. The atleast–n quantification is a quantification comprising minimum (or maximum) cardinality n and the number of referents of the variable introduced by this quantification is more (less) than or equal to n. The atleast–n quantification ranges over the concept 'branch'. An example of the atleast–n quantification may be generalized as 'It is obligatory that n1 v1 at-least n n2'. Rule $r_1$ may be seen as an instance of such quantification that may be mapped in SMT-LIBv2 representation using the below formula:

(assert (forall ((x Cluster_Rental))

(exists ((a Cluster_Branch) (b Cluster_Branch))

(and (branch_domain a) (branch_domain b)

(implies (car_rental_domain x)

(and (=(select isOwnedBy x a) t)

(=(select isOwnedBy x b) t)

(distinct a b)))))))

In a SBVR rule, sometimes the keyword 'that' is used after the designation for a noun concept and before a designation for a verb concept. The keyword 'that' introduces a restriction on the noun concept which is based on the facts defined in the vocabulary. Further, considering rule $r_2$, the concept driver is restricted by the fact "driver is authorized in country".

Rule $r_2$ may be semantically interpreted as "If driver is authorized in Sweden, then that driver has a driving license that is valid." The one or more hardware processors 104 may generate the corresponding SMT-LIBv2 as below:

(assert (forall ((x Cluster_Driver) (z Cluster_Country))

(exists ((y=Cluster_License))

(and (driving_license_domain y)

(implies (and (driver_domain x)

(driver_license_domain y)

(=Sweden z)(=(select isAuthoizedIn x z) t))

(and (=(select has x y) t)

(=(select isValidIn y) t))))))

The method disclosed uses BuRRiTo™ tool to automatically transform the SBVR vocabulary and rules into SMT-LIBv2 format. SBVR rules or definitions may comprise aspects in which a thing is measurable in terms of 'greater than', 'less than' or 'equal to'. The BuRRiTo™ may also be used to categorize the concepts belonging to certain entity according to a set of different criteria using 'categorization' capabilities.

By referring to below SBVR vocabulary, it may be noted that 'duration' is the property associated with the 'rental' which can accept the values of type Integer. To map such scenarios in SMT, the method disclosed provides for declaring a constant of a Tw-Dimensional (2-D) array which takes sort associated with the concept 'rental' and the Integer sort as the parameters. Considering an example scenario, SMT-LIBv2 generated for the concept 'medium duration rental' may be generated as below:

SBVR Vocabulary $n_1$: rental
$n_2$: duration
$n_3$: low duration rental

Definition: rental that has duration less than or equal to 4 days $n_4$: medium duration rental Definition: rental that has duration greater than 4 days and less than 6 days $n_5$: high duration rental Definition: rental that has duration greater than or equal to 6 days

SMT-LIBv2 for the Above SBVR Vocabulary (declare-const durationInt (Array Cluster_Rental Int))
(assert (forall ((x Cluster_Rental) (a Cluster_Duration))
(implies
(and (medium_duration_rental_domain x) (duration_domain a))
(and (=(select has x a) t)
(>(select durationInt x) 4)
(<(select durationInt x) 6)))))

According to an embodiment of the present disclosure, at step 304, the one or more hardware processors 104 are configured to detect, from the one or more SMT-LIB formulas, one or more inconsistencies in semantics of SBVR by using a SMT solver invocation. Conflicting set of rules are identified in the form of unsatisfiable cores. Each unsatisfiable core returns a subset of named formulas. The one or more hardware processors 104 further add labels to the assertions so that the command 'get-unsat-core' can use the added labels in UNSAT core output. Let $f_i$ be a function for rule $r_i$ that exists in the system and $X_i$ be the name to it. The conflict may be identified by putting assert statement and check-sat for each such function.

While some of the traditional systems and methods (for example, MATH-SA™, Yices™) cite using of unsat-core generation, the method disclosed implements Z3™ as a SMT solver (or the SMT solver invocation). However, the 'get-unsat-core' identifies only one set of unsatisfiable constraints. The method disclosed provides for running the SMT solver again upon removing or correcting of the identified conflicting rule to identify next set of unsatisfiable constraints. As compared to the traditional systems and methods, the method disclosed identifies all set of inconsistent rules simultaneously. The problem of finding all set of inconsistent rules can be reduced to that of finding all minimally unsatisfiable sub-formulas. For example, considering below set of rules:

$$R=\{R_1, R_2, R_3, \ldots, R_n\}$$

If there exists some assignment to the values of the function and predicate symbols that satisfies every rule, then R is said to be satisfiable or SAT, otherwise it is unsatisfiable. The method disclosed identifies all the minimal sets of rules from R that are inconsistent with respect to each other. Thus, considering a model M represented by the below formula:

$$F=\{f(R_1), f(R_2), f(R_3), \ldots f(R_n)\}$$

wherein $f(R_i)$ is the boolean FOL formula corresponding to the rule $R_i$. For the model M, Minimal unsatisfiable sub-formulas (MUSes) may be defined as below:

$$MUSes(M) = mu = \begin{cases} mu \subseteq F \text{ and } mu \text{ is } UNSAT \\ \forall\, x \in mu, mu\backslash x \text{ is } SAT \end{cases}$$

In an embodiment, to identify all set of inconsistent rules, the method disclosed Z3's™ Python™ based Application Programming Interface (API) features which extracts all minimal unsatisfiable cores together with all maximal satisfying subsets. In other words, step of detecting the one or more inconsistencies comprises extracting, by implementing a Mapping Regions of Constraint sets (MARCO) technique, all minimally unsatisfiable sub-formulas from the one or more SMT-LIB formulas, and wherein the minimally unsatisfiable sub-formulas are minimal set of rules in the one or more SMT-LIB formulas inconsistent with each other.

As is known in the art, the MARCH technique enumerates each of the MUSes of an unsatisfiable constraint. Further, the one or more hardware processors 104 are configured to implement a Map solver technique to identify all the unsatisfiable cores, wherein The basic 'grow' and 'shrink' algorithms are used for finding an Maximal Satisfying Subset (MSS) or an MUS respectively a of constraint set.

In an embodiment, for detecting the one or more inconsistencies, the method disclosed provides for building an Inconsistency Rule Checker on top of SBVR rule editor in BuRRiTo™ tool. The SBVR rule editor facilitates an easy way to business analysts for specifying the SBVR vocabularies and rules. The one or more hardware processors 104 are configured to generate, via the BuRRiTo™ tool, the SBVR XMI based on the SBVR 1.2 meta-model, wherein the SBVR XMI may be provided as an input to the Inconsistency Rule Checker. By referring to below codes, user interface for SBVR editor may be referred.

```
Product_branch
General Concept: Product
Product_branch
General Concept: Product
Product_B has group_code
rental
luxury_rental
General Concept: Rental
            rental is insured by credit_card
            car is assigned to rental
-------Business rules------
It is obligatory that
If
Car is physically present in Euro_rent branch
Then
Car is assigned to rental
It is necessary that group_code of Product_B is Motor_Home
It is obligatory that rental is insured by atleast 2 credit_card
It is necessary that group_code of Product_B is Motor_Home_Plus
It is obligatory that
luxury rental is insured by atmost 1 credit_card
It is necessary that driver owns a license that is valid
```

The inconsistency rule checker of the BuRRiTo™ tool may detect the set of conflicting rules as below:
InConsistent Rules
It is necessary that group_code of Product_B is Motor_Home
It is necessary that group_code of Product_B is Motor_Home_Plus
InConsistent Rules
It is obligatory that rental is insured by atleast 2 credit_card
It is obligatory that
luxury rental is insured by atmost 1 credit_card It may be noted that from the set of six business rules given as input in the SBVR rule editor, the inconsistency rule checker of the BuRRiTo™ tool identifies two classes of ambiguous rules. Finally, by referring to below set of inconsistent rules, the detected one or more inconsistencies in the semantics of SBVR by implementing the method disclosed may be referred.

r1: it is necessary that each car rental is insured by at least 1 credit card
r2: it is necessary that each luxury car rental is car rental
r3: it is necessary that each luxury car rental is insured by at least 2 credit cards
r4: it is obligatory that if car is physically present in EU-Rent branch then car is assigned to rental
r5: it is impossible that if car is physically present in EU-Rent branch or car is assigned to rental.
r6: it is necessary that lowest cost group of car rental is GROUP A.

r7: it is necessary that lowest cost group of car rental is GROUP B.
r8: it is obligatory that India-Burma car movement is one-way car movement.
r9: it is obligatory that India-Burma car movement is local car movement.
r10: it is obligatory that car movement specifies car group
r11: it is obligatory that duration of each rental is less than 90 days.
r12: it is obligatory that duration of Rental A is equal to 100 days.

By referring to the above detected set of inconsistent rules, it may be noted that the rules $r_8$, $r_9$ and $rr_{10}$ are inconsistent as in the SBVR vocabulary, the concept 'one way care movement' is segmented into three disjoint concepts, that is, 'local care movement', 'in country care movement' and 'international care movement'. Further, considering the rules r11, and r12, the verb concept 'specifies' and 'is specified by' are 'inverse verb concepts' of one another, thereby resulting in ambiguities in the rules $r_{11}$, and $r_{12}$.

According to an embodiment of the present disclosure, some of the advantages of the method disclosed and a comparison of the method disclosed vis-á-vis performance of the traditional systems and methods may be considered in detail by referring to some of the experimental data. In an embodiment, experiments were conducted on below two case studies:

a. EU Car rental—EU Car Rental case study contains a set of concepts of general and specific things of importance to the EURent car rental business. It consists of 64 rules ranging over 14 different modules. The method disclosed created the SBVR rules and manually embedded the inconsistencies in each module. Further, the rules were the rules provided as an input to the Inconsistency Rule Checker implemented in the BuRRiTo™ tool. As compared to the traditional systems and methods, the method disclosed successfully identified each set of conflicting rules, thereby detecting all inconsistencies in SBVR rules.

b. Rules from Industrial Insurance Application—In an embodiment, initially, a set of 110 rules were obtained via the one or more hardware processors 104 from the Industrial case-study belonging to insurance domain. The rules were complex rules, comprising data related to liability and package policy. Further, 15 inconsistencies were added in a sample set of such rules that were converted to SBVR. The method disclosed identified a set of twelve inconsistent rules. However, the rules involving arithmetic calculations and mathematical operations (for example, sum of, product of, percentage calculation, etc.) were not mapped to the SMT-LIBv2, hence, three inconsistencies were not detected.

In an embodiment, apart from generation of correct model and effective system level test data, the method disclosed reduced the number of deductions performed by the system by minimizing the number of uninterpreted functions. Let m be the terms present in SBVR vocabulary wherein m is the sum of general noun concept terms and individual noun concept terms and sorts can have the elements from the defined vocabulary. The number of uninterpreted functions by implementing the traditional systems and methods result simply in unary fact types 0(m), for binary fact types is 0(m×n) and for n–ary is 0(mn).

Further, the method disclosed reduced the uninterpreted functions to 0(m) for unary, wherein p is the terms present in a graphical cluster corresponding to the sort associated with the argument of predicate. And for n–ary, the number of uninterpreted functions produced is $0(p_1 \times p_2 \times \ldots \times p_n)$, wherein pi is the number of terms present in the graphical cluster corresponding to the sort associated with the $i_{th}$ argument of function. Thus, the method disclosed significantly reduces the burden on the 3 core components of Z3, that is, Davis-Putnam-Logemann-Loveland (DPLL)-based Satisfiability) SAT™ solver, Satellite solvers (arithmetic, arrays, etc.)™, and E-matching abstract machine™ (quantifiers).

Thus, while the traditional systems and methods cite detecting inconsistencies in business rules, the method disclosed implements the concept of many sorted logic and graph reachability in translation of SBVR to SMT-LIBv2, thereby efficiently exploiting the FOL basis of SBVR specification. Further, the traditional systems and methods simply cite identification (or detection) of only one set of unsatisfiable constraints at a time, while the method disclosed significantly reduces the problem finding all set of inconsistent rules to that of finding all minimally unsatisfiable sub-formulas to finding all sets of conflicting rules simultaneously (as discussed supra).

The method disclosed further facilitates building of the Inconsistency Rule Checker on top of the SBVR rule editor in the BuRRiTo™ tool which successfully detects each set of inconsistent rules. Finally, the method disclosed proposes sixty different mappings for automatic translation of SBVR based rules, vocabulary, definitions and other concepts (for example, synonym, synonymous form, inverse verb concept, etc.), thereby overcoming the limitations of the traditional systems and methods.

The embodiments of present disclosure herein thus addresses the unresolved problem of simultaneously detecting all sets of inconsistencies in SBVR using Many-Sorted Logic. The embodiment, thus provides for translating the set of SBVR rules into a SBVR XMI comprising segregated SBVR vocabulary and rules. Moreover, the embodiments herein further provides for generating a plurality of graphical clusters for the segregated SBVR vocabulary to schematically represent an inheritance in the segregated SBVR vocabulary and the formulation of the one or more axioms using the Many-Sorted logic for capturing the set of existing information in each of the segregated SBVR rules.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for detecting inconsistencies in Semantics of Business Vocabulary and Business Rules (SBVR) using Many-Sorted Logic, the method comprising:
    defining, by one or more hardware processors, a set of rules expressed in SBVR, wherein the set of rules comprises syntactic and semantic ambiguities and inconsistencies, and wherein each of the set of rules facilitate one or more actions based upon a specification of one or more conditions;
    translating, via the one or more hardware processors, the set of SBVR rules into a SBVR eXtensible Markup Language Metadata Interchange (XMI) comprising segregated SBVR vocabulary and rules, wherein the translating is performed by implementing a clustering technique on the set of SBVR rules, wherein the translating comprises generating a plurality of graphical clusters for the segregated SBVR vocabulary to schematically represent an inheritance in the segregated SBVR vocabulary;
    transforming the SBVR XMI into one or more Satisfiability Modulo Theories Library (SMT-LIB) formulas using at least one logical structure and semantic of Many-Sorted Logic, wherein the transforming comprises a mapping of each of the segregated SBVR rules into a corresponding SMT-LIB representation using one or more axioms, for capturing a set of existing information in each of the segregated SBVR rules; and
    detecting, from the one or more SMT-LIB formulas, one or more inconsistencies in semantics of SBVR by using a Satisfiability Modulo Theories (SMT) solver invocation,
    wherein:
        the step of detecting the one or more inconsistencies comprises extracting, by implementing a Mapping Regions of Constraint sets (MARCO) technique, all minimally unsatisfiable sub-formulas from the one or more SMT-LIB formulas, and wherein the minimally unsatisfiable sub-formulas are minimal set of rules in the one or more SMT-LIB formulas inconsistent with each other; and
        the step of extracting all the minimally unsatisfiable sub-formulas facilitate a simultaneous detection of the one or more inconsistencies from the one or more SMT-LIB formulas.

2. The method as claimed in claim 1, wherein each of the plurality of graphical clusters are represented via a Venn diagram, and wherein each Venn diagram uses one or more axioms to represent the inheritance.

3. The method as claimed in claim 2, wherein the Venn diagram associated with each of the plurality of graphical clusters is non-empty.

4. The method as claimed in claim 1, wherein the mapping is preceded by a formulation of the one or more axioms using a Many-Sorted logic for capturing the set of existing information in each of the segregated SBVR rules.

5. A system for detecting inconsistencies in Semantics of Business Vocabulary and Business Rules (SBVR) using Many-Sorted Logic, the system comprising:
    a memory storing instructions;
    one or more communication interfaces; and
    one or more hardware processors coupled to the memory via the one or more communication interfaces, wherein the one or more hardware processors are configured by the instructions to:
    define a set of rules expressed in SBVR, wherein the set of rules comprises syntactic and semantic ambiguities and inconsistencies, and wherein each of the set of rules facilitate one or more actions based upon a specification of one or more conditions;
    translate the set of SBVR rules into a SBVR eXtensible Markup Language Metadata Interchange (XMI) comprising segregated SBVR vocabulary and rules, wherein the translating is performed by implementing a clustering technique on the set of SBVR rules, wherein the translating comprises generating a plurality of graphical clusters for the segregated SBVR vocabulary to schematically represent an inheritance in the segregated SBVR vocabulary;
    transform the SBVR XMI into one or more Satisfiability Modulo Theories Library (SMT-LIB) formulas using at least one logical structure and semantic of Many-Sorted Logic, wherein the transforming comprises a mapping of each of the segregated SBVR rules into a corresponding SMT-LIB representation using one or more axioms, for capturing a set of existing information in each of the segregated SBVR rules; and
    detect, from the one or more SMT-LIB formulas, one or more inconsistencies in semantics of SBVR by using a Satisfiability Modulo Theories (SMT) solver invocation;
    wherein:
        the one or more hardware processors are configured to detect the one or more inconsistencies by extracting, via a Mapping Regions of Constraint sets (MARCO) technique, all minimally unsatisfiable sub-formulas from the one or more SMT-LIB formulas, and wherein the minimally unsatisfiable sub-formulas are minimal set of rules in the one or more SMT-LIB formulas inconsistent with each other; and
        the step of extracting all the minimally unsatisfiable sub-formulas facilitate a simultaneous detection of the one or more inconsistencies from the one or more SMT-LIB formulas.

6. The system as claimed in claim 5, wherein the one or more hardware processors are configured to represent each of the plurality of graphical clusters via a Venn diagram, and wherein each Venn diagram uses one or more axioms to represent the inheritance.

7. The system as claimed in claim 6, wherein the Venn diagram associated with each of the plurality of graphical clusters is non-empty.

8. The system as claimed in claim 5, wherein the one or more hardware processors are configured to perform the mapping by a formulation of the one or more axioms using a Many-Sorted logic for capturing the set of existing information in each of the segregated SBVR rules.

* * * * *